United States Patent [19]

Joyce et al.

[11] Patent Number: 5,283,870
[45] Date of Patent: Feb. 1, 1994

[54] METHOD AND APPARATUS FOR AVOIDING PROCESSOR DEADLY EMBRACE IN A MULTIPROCESSOR SYSTEM

[75] Inventors: Thomas F. Joyce, Westford, Mass.; James W. Keeley, Nashua, N.H.

[73] Assignee: Bull HN Information Systems Inc., Billerica, Mass.

[21] Appl. No.: 771,296

[22] Filed: Oct. 4, 1991

[51] Int. Cl.⁵ .............................. G06F 13/14
[52] U.S. Cl. ........................ 395/200; 395/800; 364/241.8; 364/242.91; 364/252.4; 364/927.96; 364/927.97
[58] Field of Search .............. 395/800, 200, 375; 364/241.8, 242.91, 252.4, 927.96, 927.97

[56] References Cited

U.S. PATENT DOCUMENTS

| | | | |
|---|---|---|---|
| 4,669,056 | 5/1987 | Waldecker et al. | 364/900 |
| 4,928,224 | 5/1990 | Zulian | 364/200 |
| 4,958,273 | 9/1990 | Anderson et al. | 364/200 |
| 4,975,833 | 12/1990 | Jinzaki | 364/200 |
| 5,050,072 | 9/1991 | Earnshaw et al. | 364/200 |
| 5,146,607 | 9/1992 | Sood et al. | 395/800 |
| 5,163,143 | 11/1992 | Culley et al. | 395/425 |
| 5,163,144 | 11/1992 | Ikeno | 395/425 |
| 5,175,829 | 12/1992 | Stumpf et al. | 395/375 |
| 5,182,808 | 1/1993 | Bagnoli et al. | 395/725 |
| 5,193,162 | 3/1993 | Bordsen et al. | 395/425 |

*Primary Examiner*—Arthur G. Evans
*Assistant Examiner*—Diane Smith
*Attorney, Agent, or Firm*—Faith F. Driscoll; John S. Solakian

[57] ABSTRACT

A multiprocessor system includes a number of system processors which tightly couple to a system bus to share a main or system memory and a number of on-board memory processors which also are tightly coupled to the system bus. Each processor has a high performance microprocessor which tightly couples to an on-board or local memory through the microprocessor's local bus. System memory is accessible using a memory lock protocol while the local memory is accessible through a bus lock protocol. Each on-board memory processor includes a lock mechanism which enables the processing of memory lock commands directed to its local memory received via the system bus from any other processor and for issuing memory lock commands to system memory.

10 Claims, 3 Drawing Sheets

METHOD AND APPARATUS FOR AVOIDING PROCESSOR DEADLY EMBRACE IN A MULTIPROCESSOR SYSTEM

RELATED APPLICATIONS

1. The patent application of James W. Keeley and Thomas F. Joyce entitled, "High Performance Tightly Coupled Multiple Synchronous State Machine Based Processing Unit," filed on Oct. 4, 1991 bearing Ser. No. 07/771,289, which is assigned to the same assignee as this patent application.

2. The patent application of James W. Keeley entitled, "Bus Interface State Machines," filed on Oct. 4, 1991, bearing Ser. No. 07/771,712, which is assigned to the same assignee as this patent application.

3. The patent application of Thomas F. Joyce and James W. Keeley and Richard A. Lemay entitled, "Programmable Bus State Machine," filed on Oct. 4, 1991, bearing Ser. No. 07/771,297, which is assigned to the same assignee as this patent application.

BACKGROUND OF THE INVENTION

1. Field of Use

The present invention relates generally to multiprocessor systems and, more particularly, to deadlock detection apparatus for avoiding deadly embrace situations between the processing units within a multiprocessing system.

2. Prior Art

In computer systems, it is important that resources be allocated in a way that deadlock does not occur. A deadlock occurs when processes holding some resources request access to resources held by other processes in the same set. Unless the deadlock is resolved, all the processes involved are blocked indefinitely. Therefore, a deadlock requires the attention of a process outside those involved in the deadlock for its detection and resolution.

Generally, a deadlock can be resolved by aborting one or more processes involved in the deadlock and granting the released resources to other processes involved in the deadlock. A process is aborted by withdrawing all its resource requests, restoring its state to an appropriate previous state, relinquishing all the resources it acquired after that state, and restoring all the relinquished resources to their original states.

U.S. Pat. No. 4,318,182 discloses a system in which a deadlock detection mechanism detects situations where two or more processes are waiting for related events which cannot happen, preventing a requesting process from waiting for the availability of a resource or resources which are already held by a second process which is waiting directly or indirectly upon the first process. This requires that the system have access to all of the resources within the system to ensure that a requested resource is not currently assigned to a second process which is already waiting directly or indirectly for a second resource currently assigned to a first process.

In tightly coupled multiprocessor systems, the different processors are required to share data within a common or global main memory system. To preclude race conditions and the occurrence of the deadlock or deadly embrace situation, it is well known to have each processor use test and set lock instructions. That is, each processor obtains or tests the lock for a shared data structure or section of main memory. If it is unlocked, the processor gets the lock and accesses the segment. However, if the segment is locked, the processor spins in a loop, periodically testing until the lock becomes available.

While the above type of mutually exclusive protocol has been effective in eliminating the above problems, this approach may not be effective in certain types of situations which may not be easily detected. For example, this type of situation may go undetected in a multiprocessor system which includes processors with local memories where the local memories of such processors are required to be shared by other processors of the system.

Accordingly, it is a primary object of the present invention to provide a multiprocessor lock mechanism which reliably protects against deadlocks.

It is a more specific object of the present invention to provide a multiprocessor lock protocol which permits reliable accesses to all processor shared memories within a tightly coupled multiprocessor system.

SUMMARY OF THE INVENTION

The above and other objects of the present invention are achieved in a multiprocessor system which includes a number of system processors which tightly couple to a system bus to share a main or system memory and a number of on-board memory processors which also are tightly coupled to the system bus. Each on-board memory processor has a high performance microprocessor which tightly couples to an on-board or local memory through the microprocessor's local bus. System memory is accessible using a memory lock protocol while the local memory is accessible through a bus lock protocol.

Each processor has a system interface which includes circuits for implementing the memory lock protocol for accessing system memory. According to the present invention, each on-board memory processor includes a lock mechanism which enables the processing of memory lock commands directed to its local memory received via the system bus from any other processor and for issuing memory lock commands to system memory.

In the first case, when a processor issues a memory lock command on the system bus to a local memory of the on-board memory processor, the lock mechanism included as part of the system bus interface circuits effectively locks the on-board or local memory and prevents the microprocessor from accessing the local bus through the use of its local bus standard hold acknowledge mechanism. This allows the local memory to read out and transfer requested data to the system bus. The local memory maintains control of the microprocessor local bus until the entire memory lock protocol sequence is deemed completed. That is, until the data is delivered to the requesting processor and it receives a next memory write clear command from the system bus. At that time, the lock mechanism unlocks the on-board memory, transfers the write command to the local memory for writing the data into the specified location, completing the sequence.

All further memory lock commands received from the system bus are refused by the on-board processor during the time the local memory is locked thereby ensuring proper operation. Also, this enables the use of different types of system bus protocols, such as a split bus cycle protocol.

In the second case, when the on-board processor's microprocessor issues a memory read lock command to an off-board memory (i.e., to another on-board processor's local memory or to system memory), the system interface circuits convert the command into the appropriate memory read lock command sequence which it applies to the system bus. All subsequent read requests to the off-board memory are converted into normal system bus request cycles. The first write command issued by the on-board processor to the off-board memory during the memory lock protocol sequence is assumed to be directed to the same memory lock region (i.e., word or double word) and is converted to a write clear system bus cycle. As discussed, when the command is accepted by the off-board memory, both lock mechanisms are cleared (i.e., the lock mechanism of the addressed memory lock region and the lock mechanism of the on-board memory). All subsequent memory read commands issued by the microprocessor to the off-board memory during the memory lock sequence are converted to normal system bus read cycles.

The system of the present invention through the use of such lock mechanisms is able to avoid the possibility of a deadlock situation. If a memory region is already locked, the microprocessor's wait state generator circuits can insert "waits" while the bus interface retry the operation until the memory region is unlocked. By maximizing the use of existing capabilities, the system is able to provide lock functionality with little additional circuits. Further, the system of the present invention enables tasks to be properly synchronized between processors relative to accessing memory resources, notwithstanding differences in the types of locking mechanisms utilized by such processors.

The above objects and advantages of the present invention will be better understood from the following description when taken in connection with the accompanying drawings.

DETAILED DESCRIPTION OF THE PREFERRED EMBODIMENT

Figure 1:
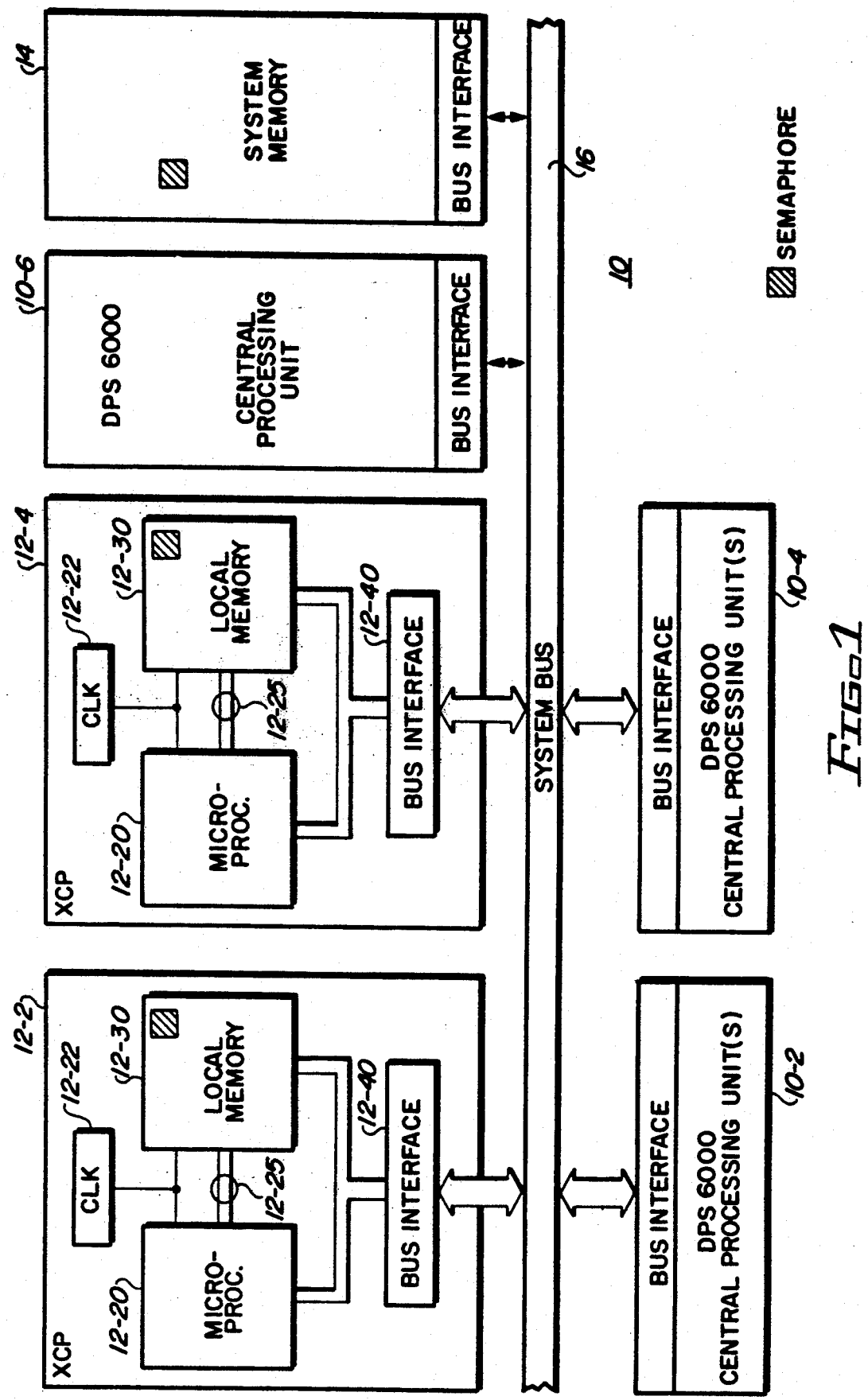
FIG. 1 is a block diagram of a multiprocessor system which incorporates the locking mechanism of the present invention.

Description of FIG. 1

FIG. 1 shows a multiprocessor system 10 which includes a plurality of central processing units 10-2 through 10-6 and peer processors 12-2 and 12-4 which tightly couple in common to a system bus 16 and to a main memory or system memory 14. Each processor, as shown, includes a bus interface area which enables the unit to transmit or receive requests in the form of commands, interrupts, data or responses/status to another unit on system bus 16. In the preferred embodiment, the system bus 16 operates asynchronously and uses a split bus cycle protocol which provides higher performance by granting other units bus cycles during the period of time a unit is waiting for main memory to furnish data in response to an earlier request made by that unit. For further information regarding this type of bus interface and operation, reference may be made to U.S. Pat. No. 3,997,896.

Referring to FIG. 1, it is seen that each peer processor 12-2 and 12-4 includes a microprocessor 12-20, a local memory 12-30 and interface buses which couple to the bus interface circuits of block 12-40 as shown. The microprocessor 12-20 and local memory 12-30 are tightly coupled through a local processor bus 12-25. The microprocessor 12-20 is a high performance 32-bit processor which operates at clock speeds of up to 33 MHz and in the preferred embodiment corresponds to an Intel 80486 chip. The Intel 80486 chip includes a microprocessor, a floating point math coprocessor, a memory cache controller and an 8K RAM cache unit. The principal processing function is performed by the microprocessor while complex processing functions, such as floating operations, are performed by the math coprocessor. The internal cache unit provides fast access to the data required for processing. In the preferred embodiment, peer processors 12-2 and 12-4 operate under the control of a UNIX operating system.

In FIG. 1, the processors 10-2 through 10-6 function as host processors. In the preferred embodiment, each processor takes the form of a Bull DPS6000 system which operates under the control of the Bull HVS proprietary operating system. In the system of FIG. 1, each of the processors are organized to operate in an independent manner and have access to the full complement of system resources, such as input/output units, main memory and the like.

Figure 2:
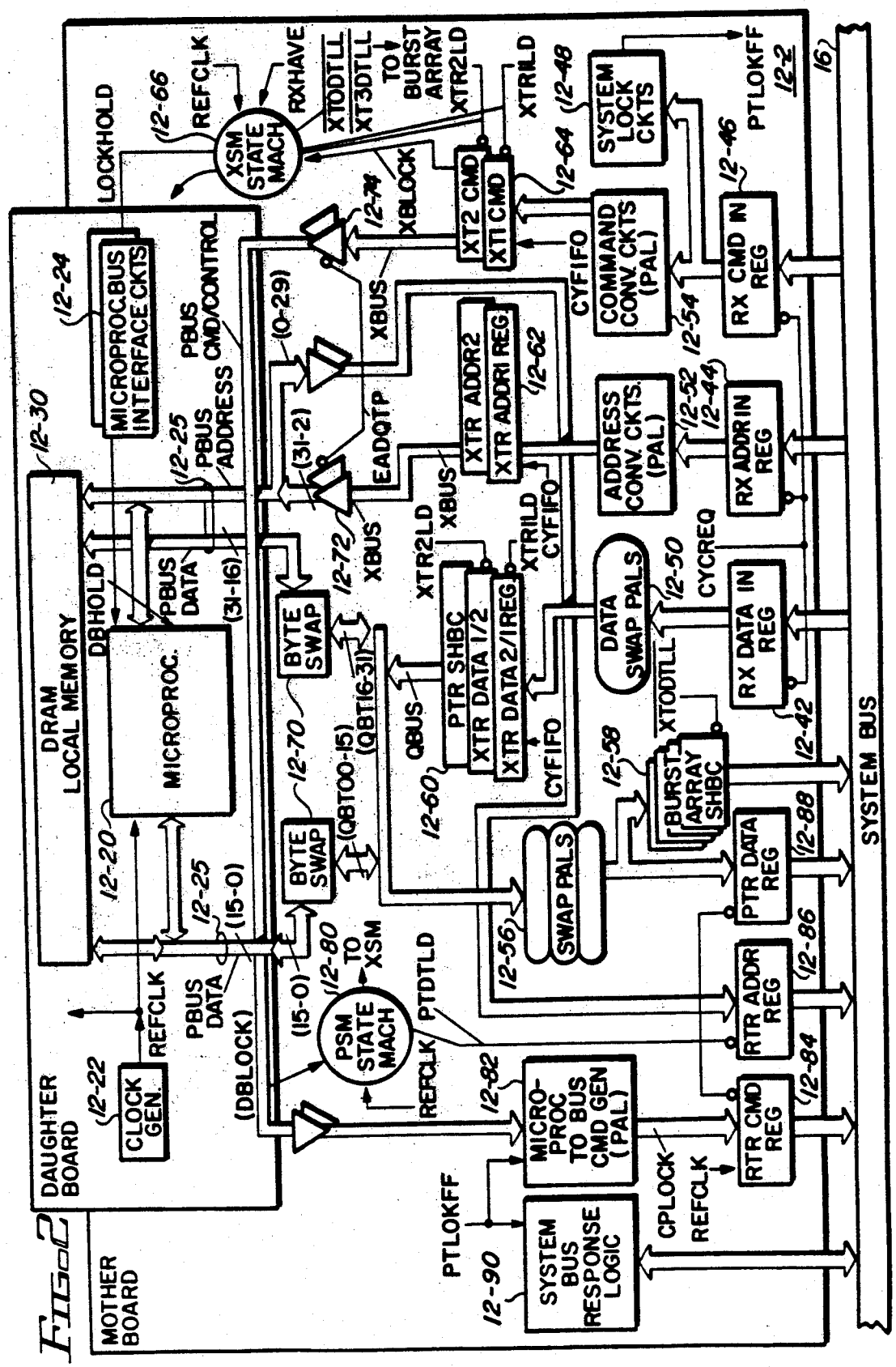
FIG. 2 shows in greater detail, one of the processors of FIG. 1 which incorporates the locking mechanism of the present invention.

Description of FIG. 2

FIG. 2 shows in greater detail, the on-board processor 12-2 of FIG. 1. In the preferred embodiment, the microprocessor 12-20 and local memory 12-30, along with associated control circuits, in addition to clock generation circuits of block 12-22, are contained on a single daughter board as shown. The clock generator circuits of block 12-22 generate a single frequency clock signal CLKREF of 33 MHz which provides the fundamental timing and internal operating frequency for microprocessor 12-20, in addition to all of the other circuits which make up processor 12-2. The bus interface circuits, sets of command, address and data registers and state control circuits are contained on the mother board. These two boards make up the entire processor.

In greater detail, the microprocessor 12-20 and local memory 12-30 are tightly coupled to the address, data and command control processor bus lines as shown. The circuits of block 12-24 are used to control the microprocessor's access to processor bus by the generation of a bus hold signal DBHOLD as a function of control signals generated by an external state machine (XSM) 12-66 included as part of the mother board. As explained herein, such control is used to implement lock functionality relative to accessing local memory 12-30 in response to external requests according to the teachings of the present invention.

When processor 12-2 does not have an external memory lock operation in process (i.e., signal PTLOKFF is off), each external request received from system bus 16 to access local memory 12-30 which has been acknowledged by the system bus response logic circuits of block 12-90 is loaded into the corresponding receive data, address and command registers 12-42 through 12-46 in response to an enable signal CYCREQ generated by clock logic circuits, not shown. The address and command signals are converted into the appropriate form by address and command converter circuits of blocks 12-52 and 12-54 and stored in available registers of the two sets of queue registers of blocks 12-62 and 12-64, in response to signal CYFIFO. Thereafter, the stored address and command signals are applied to the processor bus via the driver circuits of blocks 12-72 and 12-74, in response to an enabling signal EADQTP. Additionally, the bus command signals are applied to the system bus response logic circuits of block 12-90. According to the present invention, these circuits include a lock flip-flop which stores an indication of having received a memory lock request from system bus 16 to access local memory 12-30.

Any data associated with a request loaded into register 12-42 is reordered as required by the programmable array logic (PALs) of block 12-50 and stored into the appropriate one of the register of block 12-60. The different bytes of the data words are swapped from the so-called big endian format of the system bus to the little endian format utilized by microprocessor 12-20. This is accomplished by the byte swap circuits of block 12-70 which is implemented by the proper reordering of connector pin connections.

The XSM state machine 12-66 generates the required control signals for executing external memory read and write requests. In response to an input signal RXHAVE, which indicates the receipt of a memory request, the XSM state machine 12-66 loads the request into one of the sets of registers of the two level queue. It also properly conditions the microprocessor control bus circuits of block 12-24 for enabling transfer of the memory request via signal EADQTP to local memory 12-30 via the local bus in the same form as those memory requests made by microprocessor 12-20. Also, the XSM state machine 12-66 generates the required signals for transferring local memory data to system bus 16 via data swap circuits 12-56 and a set of registers of an array 12-58.

A processor state machine control block 12-80 controls the processing of transactions or requests initiated by microprocessor 12-20. As shown, commands generated by microprocessor 12-20 are applied to a microprocessor to bus command generator of block 12-82 which, in turn, generates the appropriate system bus command. The bus command is loaded into a processor command register 12-84, along with the appropriate address and data. The address and data are loaded into registers 12-86 and 12-88, respectively. This is all done in response to an enabling load signal PTDTLD generated by state machine 12-80 as a function of the state of processor lock control signal PTLOKFF which is applied as an input to generator 12-82 and to the system bus response circuits of block 12-90.

Figure 3:
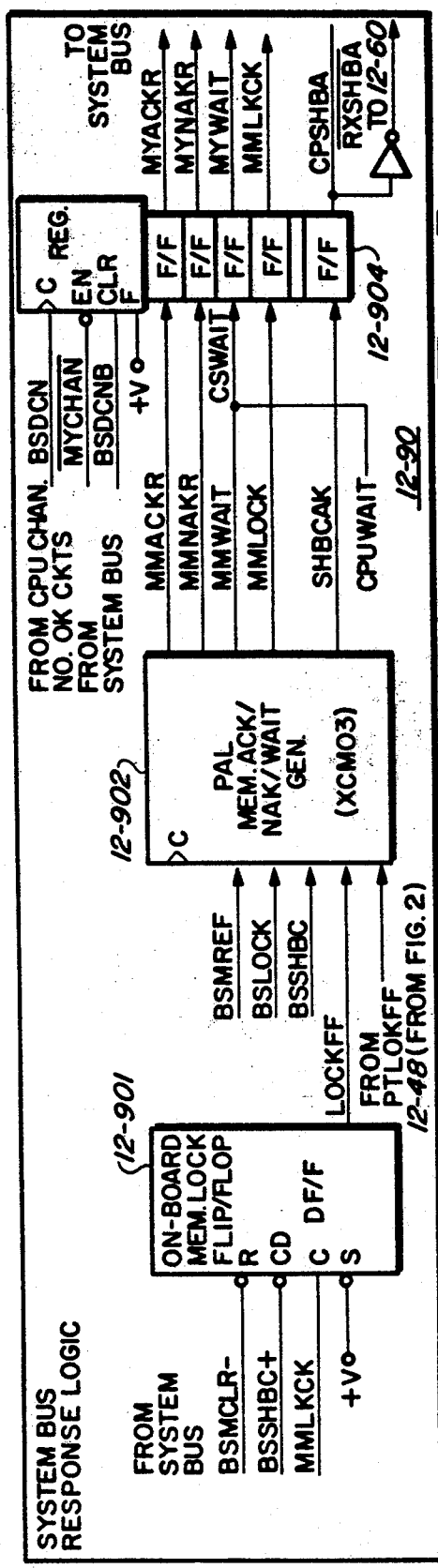
FIG. 3 shows in greater detail, the locking mechanism of FIG. 2.

Description of FIG. 3

FIG. 3 shows in greater detail, the system bus response logic circuits constructed, according to the present invention. As shown, the block 12-90 includes a memory lock flip-flop 12-901 which couples to system bus 16 and is set and cleared, in response to bus signals BSMREF, BSLOCK, BSMCLR and BSSHBC. Signal MMLKCK is used to clock the switching of flip-flop 12-901. The lock output signal LOCKFF is applied to a PAL circuit 12-902 together with bus signals BSMREF, BSLOCK and BSSHBC, in addition to processor lock signal PTLOKFF from system lock circuits 12-48. The PAL circuits 12-902 generate the required system bus response signals MMACKR through MMWAIT loaded into register 12-904 which are applied to system bus 16. Also, circuits 12-902 generate second half bus cycle acknowledgement signal CPSHBA which is inverted by circuit 12-906 and used for storing data received via system bus 16 from an off-board memory, during a system second half bus cycle. It also generates the signal MMLOCK which is used to generate clock signal MMLKCK.

Figure 4:
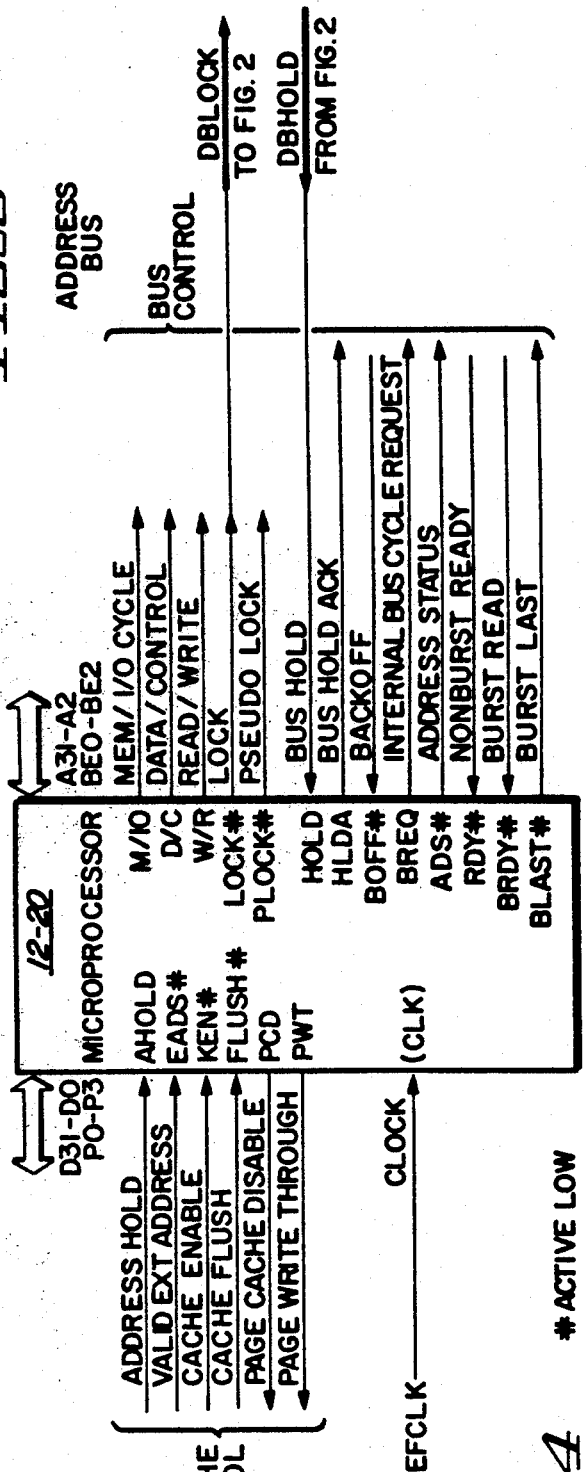
FIG. 4 shows in greater detail, the microprocessor of FIG. 2.

Description of FIG. 4

FIG. 4 shows in greater detail, the microprocessor 12-20 and the different interface signals. The interfaces are divided into sections which denote the different functions which do not necessarily correspond with the physical layout of the Intel 80486 chip. The address bus and bus control lines comprise the majority of the lines. The address lines are bidirectional for accommodating the cache bus snooping capability.

The cache control section includes six pins for controlling the microprocessor's internal cache. The cache enable (KEN) input is most frequently used to disable areas of memory that cannot be cached. The address hold (AHOLD) and external address strobe (EADS) inputs allow an external device to present the microprocessor 12-20 with an address. If the address matches an address in the microprocessor's internal cache, the associated data is flagged as invalid. The flush (FLUSH) cache input is used to inform the microprocessor that the entire contents of its cache are invalid. The page write-through (PWT) and page cache-disable (PCD) output pins reflect the states of the page attribute bit settings in internal page table entry or page directory entry registers. They indicate caching control that software has exerted over logical memory pages.

The bus control section includes thirteen pins for controlling the processor's bus. The bus request (BREQ) output signal indicates that the microprocessor needs the address/data bus. The backoff input (BOFF) enables an external device to take control of the entire address/data bus even within an active, yet incomplete cycle. The pseudo lock output signal (PLOCK) is used by the microprocessor to indicate that the transaction it is performing requires more than one bus cycle to complete. By contrast, the bus lock signal (LOCK) is used to signal a critical read-modify-write operation in which no other system element can examine the item being modified until the current operation is complete. The microprocessor will not allow a bus hold request (HOLD) to take place wherein another bus master can complete control of the bus. That is, the microprocessor will not generate a hold acknowledge signal (HLDA) in response to a bus hold request.

The memory/input-output (M/IO), data/control (D/C), and write/read (W/R) signals are used to define the type of bus cycle being initiated. The address status output signal (ADS) indicates when these bus cycle definition signals and address signals are valid. The non-burst ready input signal (RDY) indicates that the current bus cycle is complete. The burst ready input signal (BRDY) and the burst last signal (BLAST) are used to carry out burst transfer operations.

The burst ready signal indicates that the current cycle is complete and the system will continue data transfer in the next clock cycle, unless the signal BLAST is presented. The BLAST signal signifies that the burst transfer is complete. For further information regarding the use of these signals, reference may be made to the Intel publication entitled, "i486 MICROPROCESSOR," dated November, 1989, Order Number: 240440-002.

DESCRIPTION OF OPERATION

With reference to FIGS. 1 through 4, the operation of the preferred embodiment of the present invention will now be described. It will be appreciated that semaphores or shared data structures can reside in system memory 14 or in the local memory 12-30 of processor 12-2 or 12-4. The semaphore ensures that a shared resource such as an area of memory is properly accessed by the different processors of the system. In the system of the present invention, locking mechanisms are in place which provides for any combination of semaphores notwithstanding the different types of locking protocols being employed.

External/Off Board Memory Requests

It will be assumed that the microprocessor 12-2 issues a memory read lock command to perform a read-modify-write operation using the semaphore mechanism in system memory 14 represented by the shaded block in FIG. 1. This results in microprocessor 12-2 of FIG. 4 generating lock signal DBLOCK. This signal is applied to microprocessor generator 12-82. The generator 12-82 produces a system bus command as a function of signal PTLOKFF generated by system lock circuits 12-48. These circuits determine if processor 12-2 sent out a memory lock command which was acknowledged by any memory unit, including its own as explained herein. If such a command was received and acknowledged, then the processor lock command would not be issued to the system bus 16.

Assuming that no such command was received, the system lock circuits 12-48 do not generate signal PTLOKFF. This enables state machine 12-80 to generate load signal PTDTLD which loads the command into register 12-84 along with the address into register 12-86. This causes a test and set lock bus cycle to be issued to system memory 14. More specifically, read, test and set lock commands are signalled by setting signal BSLOCK to a binary ONE state while signal BSSHBC is set to a binary ZERO state.

The system bus command is processed in a conventional manner employing the standard memory lock protocol sequences. If the lock associated with the address bits OA through 22 is already set, the system memory will respond by forcing signal BSNAKR to a binary ONE. If processor 12-2 receives a WAIT or NAK response to the command, it will retry the operation. If the lock associated with address bits OA through 22 is not already set and the memory is not busy, the system memory will accept the command by forcing signal BSACKR to a binary ONE and then set the lock. Assuming that the system memory 14 acknowledges the command signaling its acceptance, the memory area is then locked.

Also, in response to the microprocessor memory lock command, the generator (PAL) 12-82 forces signal CPLOCK to a binary ONE state. This causes the setting of system lock circuits 12-48 via the system bus 16 to record the occurrence of the lock command. This enables the microprocessor 12-20 to continue operating as it does normally. That is, it still can issue another read lock operation immediately and even to the same memory structure. However, the command generator 12-82 converts the read to a generic read operation to preclude the occurrence of a deadlock condition.

The processor 12-2 continues its completion of the lock operation. During that time interval, any system lock command received by processor 12-2 from system bus 12 even through unrelated to the first command will be automatically ignored. That is, signal PTLOKFF from the system lock circuits 12-48 cause the PAL generator circuit 12-902 of FIG. 3 to generate a negative acknowledgement (NAK) signal on system bus 16. When microprocessor 12-20 issues a first write request, the microprocessor t bus command generator 12-82 converts this request into a write-clear command. That is, a write and clear lock command is generated by forcing signals BSLOCK and BSSHBC to binary ONES. The command is loaded into the register 12-84 along with the associated address and data into registers 12-86 and 12-88 in response to load signal PTDTLD.

When the write and clear lock command applied to system bus 16 is received and the system memory is not busy, it accepts the write and clear lock command by forcing signal BSACKR to a binary ONE and clears its memory lock for the addressed lock region. The write and clear lock command also resets the microprocessor's system lock circuits 12-48, forcing signals PTLOKFF to a binary ZERO state.

By assuming that the microprocessor's first write request will be directed to same lock-region of memory (i.e., 16 word block), this ensures that no deadlock condition will arise. All subsequently issued microprocessor write requests during the lock operation are converted into normal system write bus cycles.

On-Board Memory Requests

The present invention enables access to the microprocessor's local memory 12-30 by system bus requests issued by any one of the processors of FIG. 1. It is assumed that one of the processors (e.g. processor 10-6) issues a memory read lock command to processor 12-2 to perform a read-modify-write operation using the semaphore mechanism in local memory 12-30 represented by the shaded block in FIG. 1. This results in processor 10-6 issuing a memory read lock request to system bus 16. The command, address, and data signals of the memory request are loaded into registers 12-42 through 12-46 in response to signal CYCREQ. As previously discussed, this results in the on-board memory lock flip-flop 12-901 being switched on which forces signal LOCKFF to a binary ONE.

The bus command signals are converted into the corresponding microprocessor bus lock command by the circuits of block 12-54 and loaded into one of the queue registers 12-64. Also, the bus lock signal RXLOCK stored in the queue command register is applied as input signal XBLOCK to the XSM state machine 12-66, along with certain subcommand control signals derived from decoding the converted command signals stored in queue register 12-64.

The XSM state machine 12-66 generates lock hold signal LOCKHOLD which is applied to microprocessor control bus circuits of block 12-24. This forces signal DBHOLD to a predetermined state which prevents microprocessor 12-20 from accessing the microprocessor bus until the read-modify-write operation is completed. That is, signal DBHOLD allows the local memory 12-30 to read out the contents of the addressed location, send the data contents back to the system bus interface circuits and wait for the data to be delivered to processor 10-6. Upon receiving the local memory data, processor 10-6 completes the sequence by issuing a memory write and clear lock command.

Upon the receipt of the memory write and clear lock command, the interface circuits load the address, data, and command into registers 12-42 through 12-46. The write command is converted into the appropriate microprocessor bus write command for writing the associated data contained in XTRDATA register of block 12-60 into local memory 12-30, completing the operation. Also, in response to the write command, the system lock circuits reset the memory lock flip-flop 12-901 which unlocks local memory 12-30 for allowing acceptance of another locking operation.

It will be appreciated by those skilled in the art that many changes may be made without departing from the teachings of the present invention. For example, the invention may be used in conjunction with different types of protocols and commands. Also, while the preferred embodiment utilizes different PAL circuits to perform certain functions that such functions can be combined in certain instances and performed within a single circuit. Also, the invention is not limited to any specific type of circuit.

While in accordance with the provisions and statutes there has been illustrated and described the best form of the invention, certain changes may be made without departing from the spirit of the invention as set forth in the appended claims and that in some cases, certain features of the invention may be used to advantage without a corresponding use of other features.

APPENDIX

I. COMMAND DESCRIPTIONS

LOCAL MEMORY BUS CYCLE INITIATED OPERATION

| LOCAL BUS CYCLE INITIATED | LOCK | M/IO | D/C | W/R | PTLOCKFF |
|---|---|---|---|---|---|
| 1. MEMORY READ LOCK | 1 | 1 | 1 | 0 | 0 |
| 2. MEMORY WRITE LOCK | 1 | 1 | 1 | 1 | X |
| 3. MEMORY READ LOCK | 1 | 1 | 1 | 0 | 1 |

TRANSLATED SYSTEM MEMORY BUS CYCLE OPERATION

| SYSTEM BUS CYCLE INITIATED | BSLOCK | BSSHBC | MREF | BSWRIT |
|---|---|---|---|---|
| 1. MEMORY TEST READ AND SET LOCK | 1 | 0 | 1 | 0 |
| 2. MEMORY WRITE AND CLEAR LOCK | 1 | 1 | 1 | 0 |
| 3. MEMORY READ | 0 | 0 | 1 | 0 |

II. Description of PAL Circuits

Description of equation symbols:
(Where # = OR; ! = negation; and & = AND)

MODULE XCM03 - System Bus Response Logic Circuits 12-90

This PAL handles all system bus responses for cycles directed at the memory.

Pin Specifications:
(Inputs)

| | | |
|---|---|---|
| BSMREF | PIN | 1; |
| BSLOCK | PIN | 2; |
| BSSHBC | PIN | 3; |
| LOCKFF | PIN | 4; |
| BSADOG | PIN | 5; |
| BSADOH | PIN | 6; |
| MMOD06 | PIN | 7; |
| MMOD07 | PIN | 8; |
| MMSIZ0 | PIN | 9; |
| MMSIZ1 | PIN | 10; |
| PTLOKFF | PIN | 13; |
| !XTRBSY | PIN | 14; |

(Outputs)

| | | |
|---|---|---|
| MRWAK | PIN | 15; |
| MMLOCK | PIN | 17; |
| MMWAIT | PIN | 18; |
| MMNAKR | PIN | 19; |
| MMACKR | PIN | 20; |

Equates:

```
TEST_SET_LOCK   MACRO   (BSLOCK & !BSSHBC)
CLEAR_LOCK      MACRO   (BSLOCK & BSSHBC)

ADDR  = [BSAD0G,BSAD0H];
MOD   = [MMOD06,MMOD07];
MSIZE = [MMSIZ0,MMSIZ1];
```

EQUATIONS

```
MMACKR = ((MSIZE == 0) & (MOD == ADDR)  # "SIZE = 16
                                             MEGABYTES
          (MSIZE == 1) & (MMOD06 == BSAD0G) # "SIZE = 32
                                             MEGABYTES
          (MSIZE == 2)) &
           (!XTRBSY & !BSLOCK #
             !XTRBSY & TEST_SET_LOCK & !(LOCKFF #
                   PTLOKFF) #
             !XTRBSY & CLEAR_LOCK);

MMNAKR = ((MSIZE == 0) & (MOD == ADDR)  #
          (MSIZE == 1) & (MMOD06 == BSAD0G) #
          (MSIZE == 2)) &
          (TEST_SET_LOCK & (LOCKFF # PTLOKFF));

MMWAIT = ((MSIZE == 0) & (MOD == ADDR)  #
          (MSIZE == 1) & (MMOD06 == BSAD0G) #
          (MSIZE == 2) & (XTRBSY & !(TEST_SET_LOCK &
                          (LOCKFF # PTLOKFF)));

MMLOCK = ((MSIZE == 0) & (MOD == ADDR)  #
          (MSIZE == 1) & (MMOD06 == BSAD0G) #
          (MSIZE == 2))& BSMREF & !XTRBSY &
                       (TEST_SET_LOCK & !(LOCKFF #
                          PTLOKFF) # CLEAR_LOCK);
```

```
MMRWAK = ((MSIZE == 0) & (MOD == ADDR) #
          (MSIZE == 1) & (MMOD06 == BSAD0G) #
          (MSIZE == 2)) & BSMREF &
           (!XTRBSY & !BSLOCK #
             !XTRBSY & TEST_SET_LOCK & !(LOCKFF #
                       PTLOKFF) #
             !XTRBSY & CLEAR_LOCK);
```

MODULE XCM14 - System Lock Circuits 12-48

Pin Specifications:
(Inputs)

```
REFCLK    PIN    1;
!PTDTLD   PIN    2;
RXHAVE    PIN    3;
RXNAKR    PIN    4;
RXWAIT    PIN    5;
RXANYR    PIN    6;
RXPTWON   PIN    7;
RXMREF    PIN    9;
RXSRIT    PIN   10;
RXLOCK    PIN   11;
RXSHBC    PIN   13;
MBMCLR    PIN   14;
```

(Outputs)

```
PTREQP    PIN   23;
PTLOCKN   PIN   18;
PTLOKFF   PIN   17;
```

Equates:

EQUATIONS

```
PTREQP : = PTDTLD & !MBMCLR #
           RXHAVE & RXPTWON & RXWAIT & !MBMCLR #
```

```
         RXHAVE  &  RXPTWON  &  PTNKFLS  &  !MBMCLR  &
         (RXTMOT #
         !RXTMOT  &  RXNAKR  &  RXMREF  &  !RXLOCK # !RXTMOT
         &  RXNAKR  &  RXMREF  &  RXLOCK  &  RXSHBC) #
         RXHAVE   &   PTLOCKN   &   !RXNARK   &   !RXWAIT   &
         !MBMCLR  &
         RXMREF & RXLOCK & RXSHBC;

PTLOCKN  : = RXHAVE & RXPTWON & RXMREF & RXLOCK & !RXSHBC
         &  !RXTMOT & RXNARK & !MBMCLR # PTLOCKN &
         !(MBMCLR # RXHAVE & RXPTWON & !RXNAKR &
         !RXWAIT & RXANYR # RXHAVE & RXPTWON &
         PTNKFLP & RXTMOT);

PTLOKFF  : = RXHAVE & RXPTWON & RXANYR & RXMREF & RXLOCK
         & !RXSHBC & !RXNAKR & !RXWAIT & !MBMCLR #
         PTLOKFF & !(MBMCLR # RXHAVE & RXPTWON &
         RXANYR & RXMREF & RXLOCK & RXSHBC &
         !RXNAKR & !RXWAIT);
```

MODULE XCM35 - Microprocessor to Bus Generator 12-82

Pin Specifications:
(Inputs)

| | | |
|---|---|---|
| PTLOKFF | PIN | 1; |
| !HOTMIO | PIN | 2; |
| !HOTWR | PIN | 4; |
| HOTLOCK | PIN | 5; |
| !QBBE00 | PIN | 6; |
| !QBBE01 | PIN | 7; |
| !QBBE02 | PIN | 8; |
| !QBBE03 | PIN | 9; |
| QBAD16 | PIN | 10; |
| QBAD17 | PIN | 11; |
| QBAD24 | PIN | 13; |

(Outputs)

```
CPMREF    PIN    23;
CPWRIT    PIN    22;
CPLOCK    PIN    21;
CPSHBC    PIN    20;
CPDBWD    PIN    19;
CPDBPL    PIN    18;
CPBYTE    PIN    17;
QBAD30    PIN    15;
QBAD31    PIN    14;
```

Equates:

BYTEEN = [QBBE03,QBBE02,QBBE01,QBBE00];

EQUATIONS

CPMREF = HOTMIO;

CPWRIT = HOTWR;

CPLOCK = HOTMIO & HOTLOCK & (HOTWR # !HOTWR & !PTLOKFF);

CPSHBC = HOTMIO & HOTLOCK & HOTWR;

CPDBWD = HOTMIO & !HOTWR #
         !HOTMIO & (BYTEEN == ^H0F) #
         HOTMIO & HOTWR & ((BYTEEN == ^H0F) #
                           (BYTEEN == ^H0E) #
                           (BYTEEN == ^H07) #
                           (BYTEEN == ^H06));

CPDBPL = HOTMIO & !HOTWR #
         !HOTMIO & (BYTEEN == ^H0F) #
         HOTMIO & HOTWR & ((BYTEEN == ^H0F) #
                           (BYTEEN == ^H0E)) ;

CPBYTE = HOTMIO & HOTWR & ((BYTEEN == ^H01) #
                           (BYTEEN == ^H02) #

```
                    (BYTEEN == ^H04) #
                    (BYTEEN == ^H08) #
                    (BYTEEN == ^H06) #
                    (BYTEEN == ^H0E));

QBAD30 = HOTMIO & HOTWR & ((BYTEEN == ^H04) #
                           (BYTEEN == ^H08) #
                           (BYTEEN == ^H0C));

QBAD31 = HOTMIO & HOTWR & ((BYTEEN == ^H02) #
                           (BYTEEN == ^H08) #
                           (BYTEEN == ^H06) #
                           (BYTEEN == ^H0E));
```

MODULE XCM52 - XSM State Machine State Clear Generator
            Circuit - Part of 12-66

```
LOCKHOLD = !LKHLDCL & (C_REG_READSIN) &
           (S_REG--SETA_a) & BLOCK & !BSHBC
           #LOCKHOLD & !LKHLDCL.
``` where

```
LKHLDCL = (C_REG--WRITESIN) & (S_REG--SETA_a)
          & XBLOCK & XBSHBC
        # (C_REG--READSIN) & (S_REG--SETA_a)
          & XBLOCK & XBSHBC
        # (C_REG--MCLEAR) and
``` where:  S_REG    = [XSMCSA, XSMCSB, XSMCSC, XSMCSD,
                    XSMCSE];
        C_REG    = [XSMCCA, XSMCCB, XSMCCC, XSMCCD];
        SETA_a   = B00010;
        WRITESIN = B0100;
        READSIN  = B1001; and,
        MCLEAR   = B1111.

XCD06 - Bus Interface Circuits 12-24

DB HOLD = LOCKHOLD.

What is claimed is:

1. A multiprocessor system comprising a system memory, a number of system processors and a number of peer processors, each processor being tightly coupled according to a first protocol and a system memory, each of said peer processors comprising;

a microprocessor;

an on-board local memory;

a synchronous local bus connected for tightly coupling said microprocessor and said local memory together to operate according to a second protocol; and, bus interface circuits coupled to said system bus and to said local bus, said bus interface circuits including:

first transfer means coupled to said system bus and to said synchronous bus for transferring requests of said each of said peer processors received from any one of said system processors and other ones of said peer processors;

second transfer means coupled to said system bus and to said synchronous local bus for transferring requests generated by said microprocessor to said system bus according to said second protocol for reading and writing said system memory or said local memory of another one of said peer processors;

system bus response means coupled to said system bus for generating responses to requests transmitted to or received from said system bus, said response means including on-board memory lock indicator means coupled to said system bus; and, processor system lock indicator means coupled to said system bus, to said second transfer means and to said system bus response means;

said on-board memory lock indicator being set in response to each memory read lock command generated by one of said processors and received from said system bus which is used for performing a read-modify-write operation on an item of information stored in said local memory in response to each memory read lock command, said first transfer means generating an output signal on said local bus to said microprocessor for inhibiting further accesses by said microprocessor to said local memory until completion of said read-modify-write operation by said local memory; and, said processor lock indicator means being set in response to a first microprocessor memory read lock request transferred to said system bus by said second transfer means and acknowledged by said system bus response means of a specified one of said peer processors, said processor indicator means when set generating an output lock signal for inhibiting said second transfer means from transferring any further microprocessor memory read lock requests to said system bus until completion of said first read lock request thereby preventing a possibility of a deadlock condition in accessing said on-board local memories of said peer processors.

2. The system of claim 1 wherein said second transfer means converts each microprocessor memory read lock command subsequently received from said microprocessor during the completion of said first read lock request into a normal read command.

3. The system of claim 1 wherein said output signal from said on-board memory lock indicator causes said system bus response means to signal non acceptance of each subsequent memory lock request received from said system bus until the completion of said microprocessor memory read lock command.

4. The system of claim 1 wherein said said second protocol used to access local memory is a synchronous bus protocol.

5. The system of claim 1 wherein said first protocol used to access said system bus is a memory bus protocol.

6. The system of claim 1 wherein said first transfer means includes first conversion means for converting each of said memory read lock commands received from said system bus into a memory read lock bus command consistent with said second protocol.

7. The system of claim 1 wherein said second transfer means includes second conversion means for converting each of said microprocessor memory read lock commands into commands which utilize said first protocol.

8. The system of claim 1 wherein said second conversion means converts a first write command following said first memory read lock command received from said microprocessor into a write clear command.

9. The system of claim 8 wherein said processor lock indicator means in response to said write clear command received from said system bus switches to a reset state enabling said peer processor to accept further system memory lock commands from said system bus.

10. The system of claim 7 wherein said first protocol utilizes a split bus cycle mode of operation.

* * * * *